United States Patent Office 3,356,694
Patented Dec. 5, 1967

3,356,694
3-KETO-4-METHYLENE DERIVATIVES OF THE ANDROSTANE AND PREGNANE SERIES AND PROCESS THEREFOR
William H. W. Lunn, Montreal, Quebec, Canada, assignor to Syntex Corporation, Panama, Panama, a corporation of Panama
No Drawing. Filed Aug. 17, 1965, Ser. No. 480,487
Claims priority, application Mexico, Aug. 20, 1964, 78,579
22 Claims. (Cl. 260—397.3)

ABSTRACT OF THE DISCLOSURE

Novel 3-keto-4-methylene and $\Delta^1$-dehydro steroids of the androstane and pregnane series are prepared by a process comprising the condensation of a 3-keto steroid having a saturated A-ring or a $\Delta^1$-double bond with paraformaldehyde in dimethyl sulfoxide solution and in the presence of boron trifluoridedimethyl sulfoxide complex as catalyst. The novel compounds of the androstane series are anabolic agents having a favorable anabolic-androgenic ratio. The novel compounds of the pregnane series are progestational agents, useful in the treatment of menstrual disorders and fertility control while others are cortical hormones with anti-inflammatory activity, thus useful in the treatment of rheumatoid arthritis and the like. Applied to a 3-keto-$\Delta^4$-steroid of the androstane or pregnane series, the process of the invention affords a mixture of a 3-keto-1-methylene and a 3-keto-$\Delta^4$-6-methylene steroid of the androstane or pregnane series.

The present invention relates to a new process for preparing cyclopentanophenanthrene derivatives.

In particular, it relates to a new process for preparing 2-methylene, 4-methylene, and 6-methylene derivatives of 3-keto steroids, as well as to the novel 4-methylene derivatives of the androstane and pregnane series represented by the following formulas:

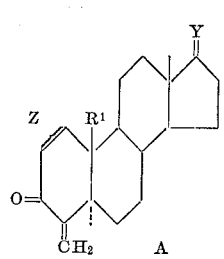

A

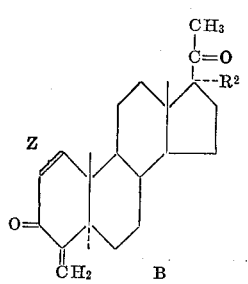

B

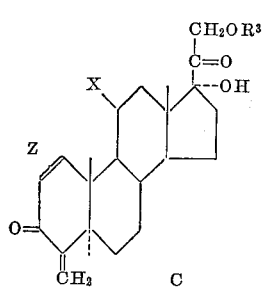

C

In the above formulas R' represents hydrogen or a methyl radical; $R^2$ represents hydrogen, hydroxy or an acyloxy radical of less than 12 carbon atoms; $R^3$ represents hydrogen or an acyl radical of less than 12 carbon atoms; Z represents a single or a double bond between C-1 and C-2; X represents hydrogen, keto or β-hydroxy; and Y represents two hydrogen atoms, a keto group or the grouping

The acyl and acyloxy groups mentioned above are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by Formula A are powerful anabolic agents with a favorable anabolic-androgenic ratio, and also possess anti-estrogenic, anti-gonadotrophic and anti-fibrillatory activities.

The compounds represented by Formula B are progestational agents useful in the treatment of menstrual disorders and fertility control, lower the cholesterol level in blood and inhibit the activity of the pituitary gland.

The compounds represented by Formula C are cortical hormones with anti-inflammatory activity and relatively low catabolic, glycogenic and thymolitic action, useful in the treatment of rheumatoid arthritis, dermatitis, etc.

The methods employed for the introduction of a methylene group in α-position to a keto group in a saturated ketone or in γ position to a keto group in an α,β unsaturated ketone in steroidal compounds are complicated and involve a series of reactions.

Thus, for example, the preparation of 6-methylene-$\Delta^4$-3-keto-steroids has been described, among others, by D. Burn et al., Tetrahedron, vol. 20, p. 597 (1964) by treatment of a 3-enolether derived from a $\Delta^4$-3- keto steroid with the Vilsmaier reagent, followed by hydrolysis of the imino compound to give the 6-formyl 3-alkoxy-$\Delta^{3,5}$-steroid, which upon catalytic hydrogenation or sodium borohydride reduction produces the respective 6-hydroxy-methyl derivative. Upon acid treatment of the latter compound the 3-enol ether group is hydrolyzed with a simultaneous dehydration of the hydroxymethyl group, thus obtaining the 6-methylene-$\Delta^4$-3-keto compound.

The 6-methylene-$\Delta^4$-3-keto steroids have been also obtained by subjecting the respective 6-keto compound to the Wittig reaction.

The 2-methylene-3-keto steroids have been obtained by reduction of 2-aminomethylene-3-keto compounds with sodium borohydride in methanol followed by re-oxidation at C-3 with 2,3-dichloro-5,6-dicyano-1,4-benzoquinone [J. Edwards et al., J. Med. Chem. 6 178 (1964)].

In accordance with the present invention the surprising discovery has been made that by condensation of a saturated 3-keto steroid with paraformaldehyde in the presence of dimethyl sulfoxide and boron trifluoride, there are obtained the 4-methylene steroids in very good yields, that is, a methylene radical is introduced in a position adjacent to the keto group. In a similar manner, starting from an α,β unsaturated ketone, specifically from a Δ⁴-3-keto or Δ¹-3-keto-steroid, the methylene group is introduced in α-position to the keto group or in the position adjacent to the double bond, i.e., in γ position to the keto group, as illustrated in the following equations, wherein only rings A and B of the steroid molecule are represented:

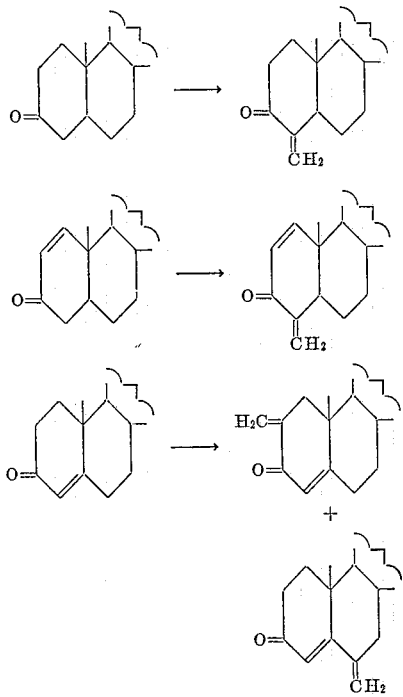

As hereinabove indicated, the starting materials employed in the present invention are the 3-keto steroids of the androstane or pregnane series which may possess additional double bonds in conjugation with the keto group or in other positions of the steroid molecule, as well as other substituents which do not interfere with the reaction, such as lower hydrocarbon radicals (such as, for example, methyl, ethyl, propyl, vinyl, ethynyl, etc.), hydroxyl groups, halogens, alkylidenedioxy groups, etc. These additional substituents may be found preferably in one or several of the following positions: C–1, C–6, C–7, C–9, C–11, C–12, C–14, C–15, C–16, C–17 and C–21.

Where the starting materials are compounds of the pregnane series, it is necessary to protect the C–20 keto group, either by reduction or by formation of a ketal. In compounds possessing the dihydroxyacetone side chain, the C–20 keto group is protected by formation of the 17,20;20,21-bismethylenedioxy derivative.

It is not necessary to protect the keto group at C–17 in the 3,17-diketo androstanes since under the reaction conditions used, the reaction is effected preferably with respect to the keto group at C–3.

The 11-keto group does not react under the conditions of the reaction.

In practicing the process illustrated above, a saturated or unsaturated 3-keto steroid of the type hereinabove described, is reached with an excess of paraformaldehyde in dimethyl sulfoxide solution and in the presence of a boron trifluoride-dimethyl sulfoxide complex as catalyst, at a temperature comprised between room temperature and the reflux temperature of the solvent, for a period of time of between 30 minutes and 20 days, depending upon the steroid used as starting material.

The boron trifluoride-dimethyl sulfoxide complex is formed in situ, before the addition of the steroid and paraformaldehyde, by heating from 0.5 to 4 parts of dimethyl sulfoxide with 0.02 to 0.06 parts of boron tri-fluoride etherate, under anhydrous conditions until reaching the reflux temperature of the dimethyl sulfoxide. The amount of paraformaldehyde used is comprised between 2 and 10 molar equivalents, preferably 5 equivalents. The best results are obtained by effecting the condensation at a temperature comprised between 60 and 100° C. for a period of time between 2 and 4 hours.

The reaction products are isolated by extraction with an organic solvent non-miscible with water and are purified by fractional crystallization or chromatography.

Where the starting compound is of the pregnane series, the C–20 keto is first protected as a ketal and subsequently regenerated by conventional hydrolysis methods such as, for example, by treatment with p-toluenesulfonic acid in acetone. If a 20-hydroxy pregnane is used as the starting material, it is preferably oxidized with an 8 N solution of chromic acid in aqueous acetone and in sulfuric acid medium. The dihydroxyacetone side chain, protected in the form of the bismethylenedioxy derivative, is regenerated also by convetnional methods, preferably by reflux with 60% formic acid.

The novel 4-methylene steroids may be esterified in a conventional manner, that is, by treatment with acid anhydrides or acid chlorides of less than 12 carbon atoms in pyridine solution for the acylation at C–21 or of secondary hydroxyl groups at C–17, or using carboylic acid anhydrides of the type hereinabove indicated in benzene solution and in the presence of p-toluenesulfonic acid for the esterification of tertiary hydroxyl groups at C–17.

It is obvious that the method object of the present invention may be also used for introducing methylene groups in positions adjacent to keto groups present in other positions of the steroid molecule, that is, using 2, 6, 17, 16, and 20 keto steroids as starting materials.

The following specific examples serve to illustrate but are not intended to limit the scope of the present invention.

PREPARATION 1

A mixture of 10 g. of allopregnan-3β-ol-20-one, 250 cc. of anhydrous benzene, 50 cc. of ethyleneglycol and 500 mg. of p-toluenesulfonic acid (monohydrate) was refluxed for 8 hours using a water separator. It was then washed with aqueous sodium bicarbonate solution and water, dried over anhydrous sodium sulfate and evaporated to dryness. Crystallization from acetone-hexane afforded 20-ethylenedioxy-allopregnan-3β-ol.

A solution of 6 g. of the foregoing ketal in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 20-ethylenedioxy-allopregnan-3-one.

In the same manner, starting from allopregnane-3α,17α-diol-20-one there were obtained successively 20-ethylenedioxy-allopregnane-3α,17α-diol and 20-ethylenedioxyallopregnan-17α-ol-3-one.

PREPARATION 2

To a solution of 5 g. of allopregnane-17α,21-diol-3,20-dione in 200 cc. of chloroform there were added 40 cc. of a 37% aqueous solution of formaldehyde and 5 cc. of concentrated hydrochloric acid, and the mixture was stirred for 48 hours at room temperature. The two layers were separated, the aqueous layer was washed with chloroform and the organic solutions were combined and washed to neutrality with water, dried over anhydrous sodium sulfate and evaporated to dryness. The residue was recrystallized from methanol-ether thus producing 17,20;20,21-bismethylenedioxy-allopregnane-3-one.

In the same manner, allopregnane-17α,21-diol-3,11,20-trione and allopregnane-11β,17α,21-triol-3,20-dione were converted respectively into 17,20;20,21-bismethylenedioxy-allopregnane-3,11-dione and 17,20;20,21-bismethylenedioxyl-allopregnan-11β-ol-3-one.

PREPARATION 3

A mixture of 6 g. of 20-ethylenedioxy-allopregnan-3-one, 100 cc. of dioxane and 1.1 molar equivalents of 2,3-dichloro-5,6-dicyano-1,4-benzoquinone was heated at reflux temperature for 8 hours. The hydroquinone formed during the reaction was filtered off and the filtrate evaporated to dryness. The residue was dissolved in acetone and filtered through 20 g. of washed alumina. Crystallization from acetone-hexane gave 20-ethylenedioxy-Δ¹-allopregnen-3-one.

By the same method the compounds mentioned under I were converted into the corresponding 1-dehydro derivatives listed under II:

| I | II |
|---|---|
| 20-ethylenedioxy-allopregnan-17α-ol-3-one. | 20-ethylenedioxy-Δ¹-allopregnen-17α-ol-3-one. |
| 17,20;20,21-bismethylenedioxy allopregnan-3-one. | 17,20;20,21-bismethylene-dioxy-Δ¹-allopregnen-3-one. |
| 17,20;20,21-bismethylenedioxy allopregnan-11β-ol-3-one. | 17,20;20,21-bismethylene-dioxy-Δ¹-allopregnen-11β-ol-3-one. |
| 17,20;20,21-bismethylenedioxy allopregnane-3,11-dione. | 17,20;20,21-bismethylene-dioxy-Δ¹-allopregnene-3,11-dione. |
| Androstan-3-one. | Δ¹-androsten-3-one. |
| 19-nor-androstan-17β-ol-3-one. | Δ¹-19-nor-androsten-17β-ol-3-one. |
| 19-nor-androstane-3,17-dione. | Δ¹-19-nor-androstene-3,17-dione. |

*Example I*

A mixture of 13.2 cc. of dimethyl sulfoxide and 0.88 cc. of recently distilled boron trifluoride etherate was heated under anhydrous conditions and with slow distillation until reaching a temperature of approximately 174° C.; it was then cooled to room temperature, thus obtaining the boron trifluoride-dimethyl sulfoxide complex in solution of dimethyl sulfoxide.

To the cold solution there were added 14.3 g. of Δ⁴-androstene-3,17-dione and 6.6 g. of paraformaldehyde, and the mixture was heated on the steam bath for 2½ hours under vigorous stirring. The reaction mixture was cooled to approximately 10° C., it was carefully poured on ice water and extracted with ether, the organic extract was washed with water to neutral, dried over anhydrous sodium sulfate and evaporated to dryness. Upon chromatography of the residue on washed alumina there were obtained 2-methylene-Δ⁴-androstene-3,17-dione and 6-methylene-Δ⁴-androstene-3,17-dione in pure form.

*Example II*

To the boron trifluoride-dimethyl-sulfoxide complex prepared from 15 cc. of dimethyl sulfoxide and 0.44 cc. of boron trifluoride-etherate there were added 7 g. of androstan-17β-ol-3-one and 3.3 g. of paraformaldehyde and the mixture was heated at 60° C. in an oil bath under vigorous stirring for 4 hours.

The product was isolated following the technic described in the preceding example, thus obtaining 4-methylene-androstan-17β-ol-3-one.

*Example III*

Example I was repeated but instead of heating on the steam bath the reaction mixture was allowed to stand at room temperature for 20 days, with the same results.

*Example IV*

To the boron trifluoride-dimethyl sulfoxide complex prepared from 20 cc. of dimethyl sulfoxide and 0.3 cc. of boron trifluoride etherate there were added 4 g. of paraformaldehyde and 5 g. of androstan-3-one and the mixture was heated at reflux temperature for 30 minutes, under vigorous stirring. The product was isolated in accordance with the technic described in Example I, thus obtaining 4-methylene-androstan-3-one.

*Example V*

Example II was repeated but instead of heating at 60° C. the reaction mixture was allowed to stand at room temperature for 10 days, thus obtaining also 4-methylene-androstan-17β-ol-3-one.

*Example VI*

To the boron trifluoride-dimethyl sulfoxide complex prepared from 15 cc. of dimethyl sulfoxide and 0.25 cc. of boron trifluoride etherate there were added 5 g. of testosterone and 2 g. of paraformaldehyde, and the reaction mixture was heated on the steam bath for 4 hours, at the end of which the product was isolated in accordance with the technic described in Example I. Upon chromatography of the residue on washed alumina there were obtained 2-methylene-testosterone and 6-methylene-testosterone in pure form, identical to authentic samples.

In the same manner starting from 19-nor-testosterone there were obtained its 2-methylene and 6-methylene derivatives.

*Example VII*

A mixture of 20 cc. of dimethyl sulfoxide and 0.75 cc. of recently distilled boron trifluoride etherate was heated under anhydrous conditions and with slow distillation until reaching an approximate temperature of 174° C.; it was then cooled and 5 g. of Δ⁴-pregnen-20β-ol-3-one and 4 g. of paraformaldehyde were added, and the reaction mixture was heated in an oil bath at 160° C. for 2 hours. It was cooled, poured into ice water and extracted with ethylacetate, the organic extract was washed with water to neutral, dried over anhydrous sodium sulfate and evaporated to dryness under reduced pressure.

The oily residue thus obtained (mixture of 2-methylene-Δ⁴-pregnen-20β-ol-3-one and 6-methylene-Δ⁴-pregnen-20-β-ol-3-one) was dissolved in 50 cc. of acetone, the solution was cooled to 0° C. and treated under nitrogen atmosphere and with stirring with an 8 N solution of chromic acid (prepared by mixture of 26 g. of chromium trioxide with 23 cc. of concentrated sulfuric acid and dilution with water to 100 cc.) until the color of the reagent persisted in the mixture. It was then stirred for 5 minutes further at 0–5° C. and diluted with water. The precipitate was filtered off, washed with water and dried under vacuo.

By chromatography on 250 g. of neutral alumina there were obtained 2-methylene-progesterone and 6-methylene-progesterone in pure form.

*Example VIII*

In accordance with the method described in Example I, the compounds mentioned under I were converted into the products set forth under II, which were separated by chromatography:

| I | II |
|---|---|
| Δ¹-androsten-3-one. | 2-methylene-Δ⁴-androsten-3-one and 6-methylene-Δ⁴-androsten-3-one. |
| 17,20;20,21-bismethylenedioxy-Δ⁴-pregnen-3-one. | 2-methylene-17,20;20,21-bismethylenedioxy-Δ⁴-pregnen-3-one and 6-methylene-17,20;20,21-bismethylenedioxy-Δ⁴-pregnen-3-one. |
| 17,20;20,21-bismethylenedioxy-Δ⁴-pregnene-3,11-dione. | 2-methylene-17,20;20,21-bismethylenedioxy-Δ⁴-pregnene-3,11-dione and 6-methylene-17,20;20,21-bismethylenedioxy-Δ⁴-pregnene-3,11-dione. |
| 17,20;20,21-bismethylenedioxy-Δ⁴-pregnen-11β-ol-3-one. | 2-methylene-17,20;20,21-bismethylenedioxy-Δ⁴-pregnen-11β-ol-3-one and 6-methylene-17,20;20,21-bismethylenedioxy-Δ⁴-pregnen-11β-ol-3-one. |

Example IX

In accordance with the method described in Example II, the compounds mentioned under I were converted into the 4-methylene derivatives II:

| I | II |
|---|---|
| Androstane-3,17-dione. | 4-methylene-androstane-3,17-dione. |
| 19-nor-androstene-3,17-dione. | 4-methylene-19-nor-androstane-3,17-dione. |
| 19-nor-androstan-17β-ol-3-one. | 4-methylene-19-nor-androstan-17β-ol-3-one. |
| 17,20;20,21-bismethylenedioxy-allopregnan-3-one. | 4-methylene-17,20;20,21-bismethylenedioxy-allopregnan-3-one. |
| 17,20;20,21-bismethylenedioxy allopregnane-3,11-dione. | 4-methylene-17,20;20,21-bismethylenedioxy-allopregnane-3,11-dione. |
| 17,20;20,21-bismethylenedioxy-allopregnan-11β-ol-3-one. | 4-methylene-17,20;20,21-bismethylenedioxy-allopregnan-11β-ol-3-one. |

Example X

To the boron trifluoride-dimethyl sulfoxide complex prepared from 8 cc. of dimethyl sulfoxide and 0.3 cc. of boron trifluoride etherate there were added 2 g. of 20-ethylenedioxy-allopregnan-3-one and 1.5 g. of paraformaldehyde and the reaction mixture was heated on the steam bath under vigorous stirring for 4 hours. It was then cooled, poured carefully into ice-water and extracted with ethyl acetate, the extract was washed with water to neutral, dried over anhydrous sodium sulfate and evaporated to dryness. The oily residue thus obtained was dissolved in 20 cc. of acetone and 200 mg. of p-toluenesulfonic acid were added, and the reaction mixture was kept at room temperature overnight. It was then poured into ice water, extracted with ethyl acetate and the organic extract washed with water to neutral, dried and evaporated to dryness. The addition of ether gave 4-methylene-allopregnane-3,20-dione.

In the same manner but using as starting materials 20 - ethylenedioxy - allopregnan - 17α - ol - 3 - one, 20-ethylenedioxy - Δ¹ - allopregnen - 3 - one and 20-ethylenedioxy - Δ¹ - allopregnen - 17α - ol - 20 - one there were obtained respectively 4-methylene-allopregnan-17α-ol-3,20-dione, 4-methylene-Δ¹-allopregnene-3,20-dione and 4-methylene-Δ¹-allopregnen-17α-ol-3,20-dione.

Example XI

By following the method described in Example I the compounds listed under I were converted into the products under II:

| I | II |
|---|---|
| Δ¹-androsten-17β-ol-3-one. | 4-methylene-Δ¹-androsten-17β-ol-3-one. |
| Δ¹-androstene-3,17-dione. | 4-methylene-Δ¹-androstene-3,17-dione. |
| Δ¹-androsten-3-one. | 4-methylene-Δ¹-androsten-3-one. |
| Δ¹-19-nor-androsten-17β-ol-3-one. | 4-methylene-Δ¹-19-nor-androsten-17β-ol-3-one. |
| Δ¹-19-nor-androstene-3,17-dione. | 4-methylene-Δ¹-19-nor-androstene-3,17-dione. |
| 17,20;20,21-bismethylene-dioxy-Δ¹-allopregnen-3-one. | 4-methylene-17,20;20,21-bismethylenedioxy-Δ¹-allopregnen-3-one. |
| 17,20;20,21-bismethylene-dioxy-Δ¹-allopregnen-11β-ol-3-one. | 4-methylene-17,20;20,21-bismethylenedioxy-Δ¹-allopregnen-11β-ol-3-one. |
| 17,20;20,21-bismethylene-dioxy-Δ¹-allopregnene-3,11-dione. | 4-methylene-17,20;20,21-bismethylenedioxy-Δ¹-allopregnene-3,11-dione. |

Example XII

A mixture of 1 g. of 4-methylene-androstan-17β-ol-3-one, 4 cc. of pyridine and 2 cc. of acetic anhydride was kept at room temperature overnight, it was then poured into ice water, the formed precipitate filtered off, washed with water and dried. Crystallization from acetone-hexane gave the acetate of 4-methylene-androstan-17β-ol-3-one.

In similar manner but using propionic, caproic and cyclopentylpropionic anhydrides as esterifying agents, there were obtained the propionate, caproate and cyclopentyl propionate of 4-methylene-dihydroallotestosterone.

Example XIII

A solution of 2 g. of 4-methylene-19-nor-androstan-17β-ol-3-one in 8 cc. of pyridine was treated with 4 cc. of benzoyl chloride and then heated on the steam bath for 1 hour. The mixture was then poured into ice water and the formed precipitate collected, washed with water and dried. Recrystallization from methylene chloride-hexane afforded 4 - methylene - 19 - nor - androstan-17β-ol-3-one benzoate.

Example XIV

To a solution of 1 g. of 4-methylene-allopregnan-17α-ol-3,20-dione in 20 cc. of anhydrous benzene there were added 200 mg. of p-toluenesoulfonic acid and 2 cc. of acetic anhydride and the mixture was allowed to stand for 24 hours at room temperature, poured into ice water, and the resulting mixture stirred to effect the hydrolysis of the excess anhydride. The benzene layer was separated and washed with 10% sodium carbonate solution and water. Drying, evaporation and crystallization of the residue from ether-hexane produced 4-methylene-allopregnan-17α-ol-3,20-dione acetate.

In the same manner, 4-methylene-Δ¹-allopregnen-17α-ol-3,20-dione was converted into its acetate.

Example XV

A mixture of 1 g. of 4 - methylene - 17,20;20,21-bis-methylenedioxy-allopregnan-3-one and 20 cc. of 60% formic acid was heated on the steam bath for 1 hour, cooled, diluted with water and the formed precipitate filtered off, washed with water, dried and recrystallized from acetone-hexane thus producing 4-methylene-allopregnane-17α,21-diol-3,20-dione.

By the same method the compounds below mentioned under I were hydrolyzed to thus produce the compounds listed under II:

| I | II |
|---|---|
| 2-methylene-17,20;20,21-bismethylenedioxy-Δ⁴-pregnen-3-one. | 2-methylene-Δ⁴-pregnene-17α, 21-diol-3, 20-dione. |
| 6-methylene-17,20;20,21-bismethylenedioxy-Δ⁴-pregnen-3-one. | 6-methylene-Δ⁴-pregnene-17α,21-diol-3,20-dione. |
| 2-methylene-17,20;20,21-bismethylenedioxy-Δ⁴-pregnene-3,11-dione. | 2-methylene-Δ⁴-pregnene-17α,21-diol-3,11,20-trione. |
| 6-methylene-17,20;20,21-bismethylenedioxy-Δ⁴-pregnen-11β-ol-3-one. | 6-methylene-Δ⁴-pregnene-11β,17α,21-triol-3,20-dione. |
| 4-methylene-17,20;20,21-bismethylenedioxy-allopregnan-3-one. | 4-methylene-allopregnane-17α,21-diol-3,20-dione. |
| 4-methylene-17,20;20,21-bismethylenedioxy-allopregnane-3,11-dione. | 4-methylene-allopregnane-17α,21-diol-3,11,20-trione. |
| 4-methylene-17,20;20,21-bismethylenedioxy-allopregnan-11β-ol-3-one. | 4-methylene-allopregnane-11β,17α, 21-triol-3,20-dione. |
| 4-methylene-17,20;20,21-bismethylenedioxy-Δ¹-allopregnen-3-one. | 4-methylene-Δ¹-allopregnene-17α, 21-diol-3,20-dione. |
| 4-methylene-17,20;20,21-bismethylenedioxy-Δ¹-allopregnene-3,11-dione. | 4-methylene-Δ¹-allopregnene-17α, 21-diol-3,11,20-trione. |
| 4-methylene-17,20;20,21-bismethylenedioxy-Δ¹-allopregnen-11β-ol-3-one. | 4-methylene-Δ¹-allopregnene-11β, 17α,21-triol-3,20-dione. |

Example XVI

In accordance with the method described in Example XII, the compounds enumerated under I were esterified with the indicated anhydrides thus producing the respective esters mentioned under II:

| I | Anhydride | II |
|---|---|---|
| 4-methylene-allopregnane-17α-21-diol-3,20-dione. | Acetic | 4-methylene-allopgegnane 17α,21-diol-3,20-dione,21-acetate. |
| 4-methylene-allopregnane-17α,21-diol-3,11,20-trione. | Propionic | 4-methylene-allopregnane 17α,21-diol-3,11,20-trione 21-propionate. |
| 4-methylene-allopregnane-11β,17α,21-triol-3,20-dione. | Caproic | 4-methylene-allopregnane 11β,17α,21-triol-3,20-dione 21-caproate. |
| 4-methylene-Δ¹-allopregnene-17α,21-diol-3,20-dione. | Enanthic | 4-methylene-Δ¹-allopregnene-17α,21-diol-3,20-dione 21-enanthate. |
| 4-methylene-Δ¹-allopregnene-17α,21-diol-3,11,20-trione. | Cyclopentyl propionic | 4-methylene-Δ¹-allopregnene-17α,21-diol-3,11,20-trione 21-cyclopentyl-propionate. |
| 4-methylene-Δ¹-allopregnene-11β,17α,21-triol-3,20-dione. | Acetic | 4-methylene-Δ¹-allopregnene-11β,17α,21-triol-3,20-dione 21-acetate. |
| 4-methylene-allopregnane-11β,17α,21-triol-3,20-dione. | Propionic | 4-methylene-allopregnane-11β,17α,21-triol-3,20-dione. |

*Example XVII*

By following the method described in Example XIV, 4 - methylene - allopregnan - 17α - ol - 3,20 - dione and 4 - methylene - Δ¹ - allopregnan - 17α - ol - 3,20-dione were esterified with propionic, caproic and enanthic anhydrides, to give the corresponding esters.

I claim:

1. A process for introducing a methylene radical in α-position to a 3-keto group in a steriod of the androstane and pregnane series, which comprises condensing a steroid selected from the group consisting of androstanes and pregnanes with paraformaldehyde in dimethyl sulfoxide solution and in the presence of boron trifluoride-dimethyl sulfoxide complex as catalyst, at a temperature between 25° C. and 175° C. for a period of time of between 30 minutes and 20 days.

2. A process in accordance with claim 1 wherein the reaction is effected at the temperature of the steam bath for a period of time of between 2 and 4 hours.

3. A process in accordance with claim 1 wherein a saturated A-ring 3-keto steroid selected from the group consisting of androstanes and pregnanes is used as the starting material, and the corresponding 4-methylene-3-keto compound is obtained.

4. A process in accordance with claim 1 wherein a 3-keto-Δ¹-steroid selected from the group consisting of androstanes and pregnanes is used as the starting material, and the corresponding 4-methylene-Δ¹-3-keto compound is obtained.

5. A process in accordance with claim 1 wherein a 3-keto-Δ⁴-steroid selected from the group consisting of androstanes and pregnanes is used as the starting material, and the corresponding 2-methylene-Δ⁴-3-keto compound in mixture with the corresponding 6-methylene-Δ⁴-3-keto steroid is obtained.

6. A compound represented by the following formula:

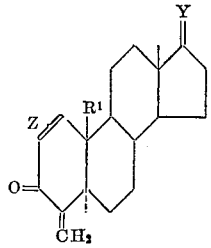

wherein R' is selected from the group consisting of hydrogen and methyl; Y is selected from the group consist-ing of two hydrogen atoms, a keto group, β-hydroxy and β-hydrocarbon carboxylic acyloxy of less than 12 carbon atoms, and Z is selected from the group consisting of a saturated linkage and a double bond between C–1 and C–2.

7. 4-methylene-androstan-3-one.
8. 4-methylene-Δ¹-androsten-3-one.
9. 4-methylene-androstan-17β-ol-3-one.
10. 4-methylene-Δ¹-androsten-17β-ol-3-one.
11. A compound represented by the following formula:

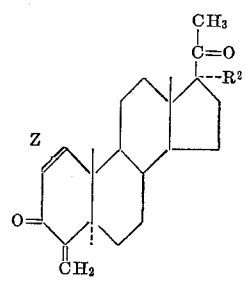

wherein Z is selected from the group consisting of a saturated linkage and a double bond between C–1 and C–2 and R² is selected from the group consisting of hydrogen, α-hydroxy and α-acyloxy of less than 12 carbon atoms.

12. 4-methylene-allopregnane-3,20-dione.
13. 4-methylene-Δ¹-allopregnene-3,20-dione.
14. 4-methylene-allopregnan-17α-ol-3,20-dione.
15. 4-methylene-Δ¹-allopregnen-17α-ol-3,20-dione.
16. A compound represented by the following formula:

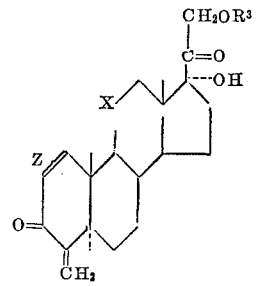

wherein Z is selected from the group consisting of a saturated linkage and a double bond between C–1 and C–2; X is selected from the group consisting of hydrogen, keto and β-hydroxy, and R³ is selected from the group consisting of hydrogen and an acyl radical of less than 12 carbon atoms.

17. 4-methylene-allopregnane-17α,21-diol-3,20-dione.
18. 4-methylene-Δ¹-allopregnene-17α,21-diol-3,20-dione.
19. 4-methylene-allopregnane-11β,17α,21-triol-3,20-dione.
20. 4-methylene-Δ¹-allopregnene-11β,17α,21-triol-3,20-dione.
21. 4-methylene-allopregnane-17α,21-diol-3,11,20-trione.
22. 4-methylene-Δ¹-allopregnene-17α,21-diol-3,11,20-trione.

No references cited.

ELBERT L. ROBERTS, *Primary Examiner.*